United States Patent
Kobayashi

(10) Patent No.: US 12,079,324 B2
(45) Date of Patent: Sep. 3, 2024

(54) INFORMATION PROCESSING DEVICE, VERIFICATION SYSTEM, AND INFORMATION PROCESSING METHOD

(71) Applicant: NEC Corporation, Tokyo (JP)

(72) Inventor: Toshiki Kobayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 566 days.

(21) Appl. No.: 17/420,329

(22) PCT Filed: Jan. 7, 2019

(86) PCT No.: PCT/JP2019/000082
§ 371 (c)(1),
(2) Date: Jul. 1, 2021

(87) PCT Pub. No.: WO2020/144729
PCT Pub. Date: Jul. 16, 2020

(65) Prior Publication Data
US 2022/0058259 A1   Feb. 24, 2022

(51) Int. Cl.
*G06F 21/00* (2013.01)
*G06F 21/44* (2013.01)
*G06F 21/57* (2013.01)

(52) U.S. Cl.
CPC .............. *G06F 21/44* (2013.01); *G06F 21/57* (2013.01); *G06F 2221/034* (2013.01)

(58) Field of Classification Search
CPC .... G06F 21/44; G06F 21/57; G06F 2221/034; G06F 21/64; Y02D 10/00
See application file for complete search history.

(56) References Cited

U.S. PATENT DOCUMENTS 11,316,868 B2 * 4/2022 Inokuchi ................. G06F 21/64
2004/0083390 A1 * 4/2004 Cuenod ............... H04L 63/0428
726/4

(Continued)

FOREIGN PATENT DOCUMENTS

JP   2004-519762 A   7/2004
JP   2007-179135 A   7/2007

(Continued)

OTHER PUBLICATIONS

International Search Report for PCT Application No. PCT/JP2019/000082, mailed on Apr. 9, 2019.

*Primary Examiner* — Kendall Dolly

(57) ABSTRACT

An information processing device 10 includes a configuration information storage unit which stores cluster configuration information making it possible to identify which cluster each information processing device in a system including multiple information processing devices belongs to, a verification information management unit which manages a first value corresponding to a content of a program of each of the information processing devices in the system; and a verification unit which derives a second value for a program in the information processing device by a method identical to a method of deriving the first value in response to reception of a verification request, and transmits the second value to a transmission source of the verification request, wherein the verification unit verifies the program in the information processing device by comparing the second value received from the information processing device with the first value.

16 Claims, 14 Drawing Sheets

(56) References Cited

U.S. PATENT DOCUMENTS

| | | | |
|---|---|---|---|
| 2007/0145124 A1* | 6/2007 | Handa | G07F 7/1008 |
| | | | 235/380 |
| 2013/0263262 A1* | 10/2013 | Forristal | G06F 21/577 |
| | | | 726/22 |
| 2021/0176609 A1* | 6/2021 | Iwai | H04W 8/00 |
| 2024/0000521 A1* | 1/2024 | Stokes | A61B 5/00 |

FOREIGN PATENT DOCUMENTS

| | | | | |
|---|---|---|---|---|
| JP | 5816373 B2 | 11/2015 | | |
| JP | 2017-055428 A | 3/2017 | | |
| WO | WO-2013036223 A1 * | 3/2013 | | G06F 11/3024 |

\* cited by examiner

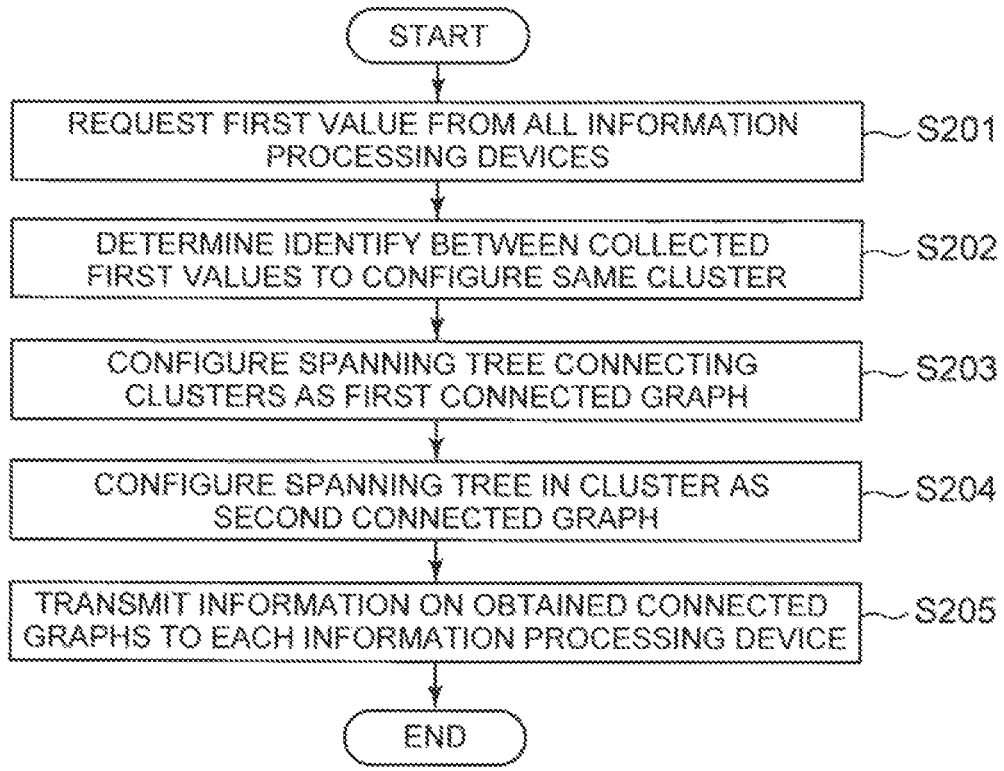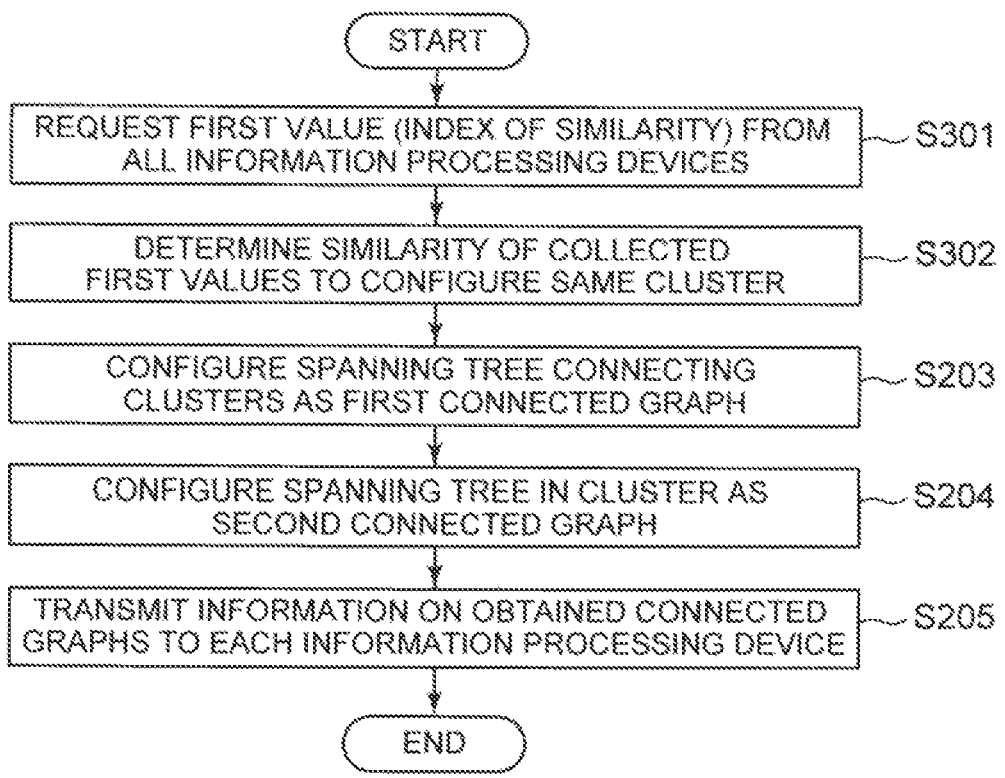

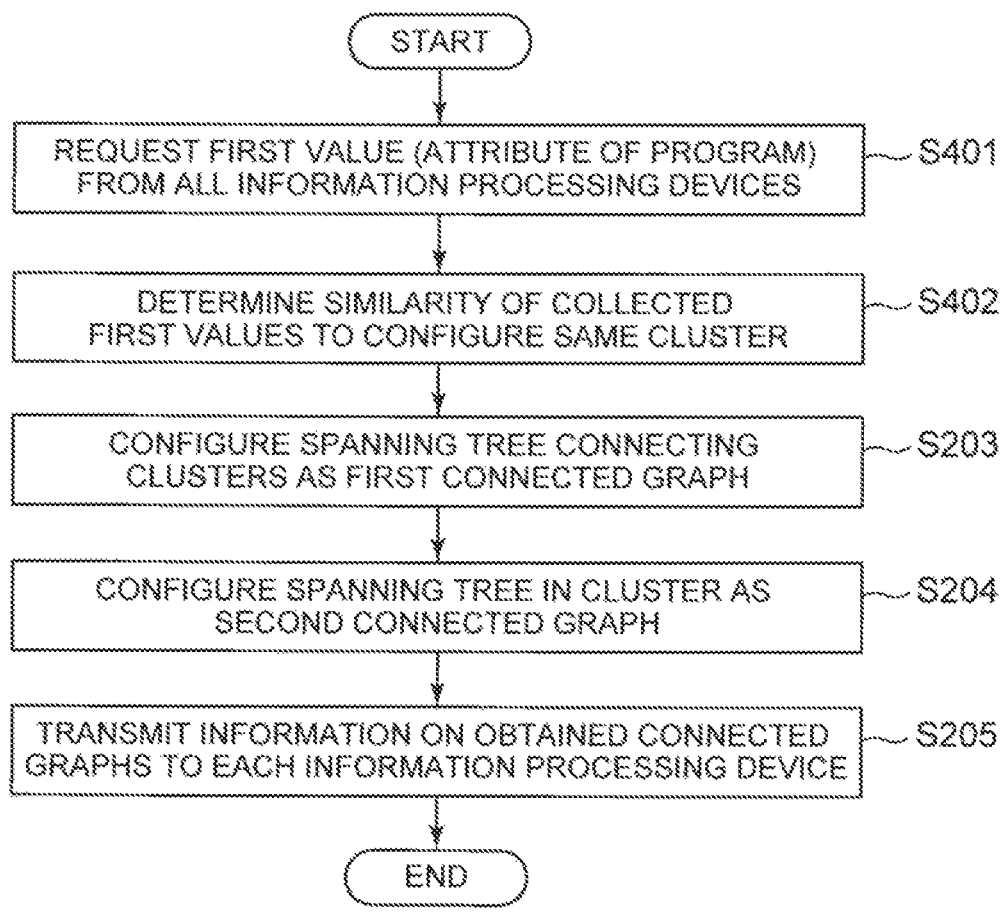

INFORMATION PROCESSING DEVICE, VERIFICATION SYSTEM, AND INFORMATION PROCESSING METHOD

This application is a National Stage Entry of PCT/JP2019/000082 filed on Jan. 7, 2019, the contents of all of which are incorporated herein by reference, in their entirety.

TECHNICAL FIELD

The present invention relates to an information processing device, a verification system, and an information processing method for verification of a program.

BACKGROUND ART

With the spread of Internet of Things (IoT) devices, security measures for guaranteeing the validity of firmware of devices have become important in the devices with low computation capability such as network cameras and smart meters.

Such security measures have been also taken in computer systems. For example, patent literature 1 discloses a method of determining security breach using an eigenvalue of firmware of a device. In the method, the eigenvalue of firmware is calculated by the device. Then, an external monitoring entity determines whether there is potential security breach based on an eigenvalue stored in advance.

CITATION LIST

Patent Literature

PTL 1: Japanese Patent No. 5816373

SUMMARY OF INVENTION

Technical Problem

In the method described in patent literature 1, the external monitoring entity needs to access a storage unit that stores eigenvalues. A first problem is that a number of eigenvalues to be stored increases. This is because there are a large number of IoT devices in an IoT system and it is necessary to hold eigenvalues for the respective devices. An increase in the number of eigenvalues leads to an increase in required capacity of the storage unit. An increase in the capacity of the storage unit leads to a decrease in access speed to required information and an increase in cost.

A second problem is that the access to the storage unit is concentrated in a case where there are a plurality of monitoring entities and devices to be verified. This is because the respective monitoring entities access the storage unit when the plurality of monitoring entities verify the devices. That is, when there are a plurality of devices to be verified, the number of times of verification itself increases, and the number of accesses to the storage unit increases. The concentration of access to the storage unit leads to an increase in time required for verification, a loss of transmission information, and the like.

Therefore, an object of the present invention is to provide an information processing device, a verification system, and an information processing method for performing device verification while preventing an increase in capacity of a storage unit and the concentration of access to the storage unit.

Solution to Problem

An information processing device according to the present invention includes configuration information storage means for storing cluster configuration information making it possible to identify which cluster each information processing device in a system including multiple information processing devices belongs to, verification information management means for managing a first value corresponding to a content of a program of each of the information processing devices in the system, and verification means for deriving a second value for a program in the information processing device by a method identical to a method of deriving the first value in response to reception of a verification request, and transmitting the second value to a transmission source of the verification request, wherein the verification means transmits the verification request to an information processing device in the cluster identified by the cluster configuration information in response to reception of the verification request, and verifies the program in the information processing device by comparing the second value received from the information processing device with the first value.

A verification system according to the present invention includes a verification server including configuration information storage means for storing cluster configuration information making it possible to identify which cluster each information processing device in a system including multiple information processing devices belongs to, and verification information management means for managing a first value corresponding to a content of a program of each of the information processing devices in the system, and an information processing device, belonging to a cluster to which the verification server belongs, including verification response means for deriving a second value for a program in the information processing device by a method identical to a method of deriving the first value in response to reception of a verification request, and transmitting the second value to a transmission source of the verification request, wherein the verification server further comprises verification means for transmits the verification request to an information processing device in the cluster identified by the cluster configuration information in response to reception of the verification request, and verifies the program in the information processing device by comparing the second value received from the information processing device with the first value.

An information processing method according to the present invention includes storing cluster configuration information making it possible to identify which cluster each information processing device in a system including multiple information processing devices belongs to, managing a first value corresponding to a content of a program of each of the information processing devices in the system, deriving a second value for a program in the information processing device by a method identical to a method of deriving the first value in response to reception of a verification request, and transmitting the second value to a transmission source of the verification request, and transmitting the verification request to an information processing device in the cluster identified by the cluster configuration information in response to reception of the verification request, and verifying a program in the information processing device by comparing the second value received from the information processing device with the first value.

An information processing program according to the present invention causes a computer to execute a process of managing a first value corresponding to a content of a program of each of information processing devices in a system including a plurality of the information processing devices, a process of deriving a second value for a program in the information processing device by a method identical to a method of deriving the first value in response to reception of a verification request, and transmitting the second value to a transmission source of the verification request, and a process of transmitting a verification request to the information processing device in a cluster identified by cluster configuration information making it possible to identify which cluster each information processing device in the system including multiple information processing devices belongs to, and verifying a program in the information processing device by comparing the second value received from the information processing device with the first value.

Advantageous Effects of Invention

According to the present invention, the device verification can be performed while preventing the increase in the capacity of the storage unit and the concentration of access to the storage unit.

BRIEF DESCRIPTION OF DRAWINGS

FIG. 5 It depicts a flowchart illustrating a cluster configuration method in the second example embodiment.

FIG. 6 It depicts a flowchart illustrating a cluster configuration method in a third example embodiment.

FIG. 7 It depicts a flowchart illustrating a cluster configuration method in a fourth example embodiment.

DESCRIPTION OF EMBODIMENTS

Hereinafter, example embodiments of the present invention will be described with reference to the accompanying drawings.

Figure 1:
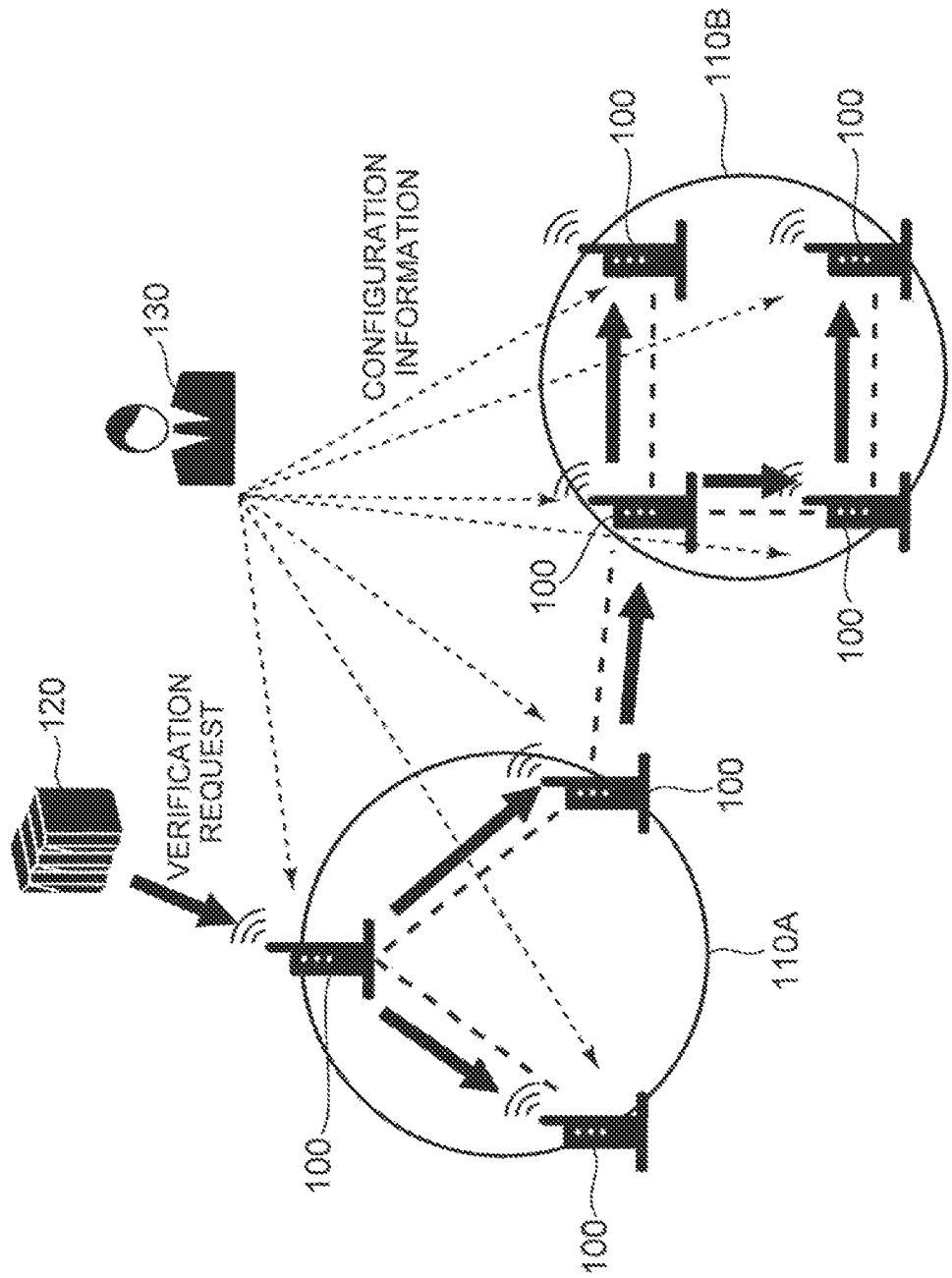
FIG. 1 It depicts an explanatory diagram illustrating an example of a system including an information processing device.

FIG. 1 is an explanatory diagram illustrating an example of a system including an information processing device of the present example embodiment. In the example illustrated in FIG. 1, a plurality of information processing devices 100 are grouped as clusters 110A, 110B. An administrator 130 transmits configuration information of the clusters 110A, 110B to all the information processing devices 100. The information processing device 100 stores the configuration information. It should be noted that, specifically, the administrator 130 transmits the configuration information through, for example, a server or the like handled by the administrator. In addition, the two clusters 110A, 110B are illustrated in FIG. 1, but the number of clusters is not limited to two.

When a verification request is transmitted from a verification request source 120, device verification is started. The verification request source 120 is, for example, a server. The device verification includes detection of the presence or absence of an illegal modification of a program installed in the information processing device 100 and detection of the presence or absence of installation of a malicious program. The information processing device 100 that has received the verification request from the verification request source 120 transmits the verification request to the other information processing device 100 in a cluster to which the own device belongs. The information processing device 100 adjacent to another cluster among the information processing devices 100 that have received the verification request transmits the verification request to the adjacent cluster. The information processing device 100 that has received the verification request from the adjacent cluster transmits the verification request to the other information processing device 100 in a cluster to which the own device belongs. In FIG. 1, it is illustrated that the verification request, which is a trigger for starting verification, is transmitted from the verification request source 120 different from the information processing device 100, but a certain information processing device 100 in a system may transmit a verification request, which is a trigger for starting verification, to the other information processing device 100.

First Example Embodiment

Figure 2:
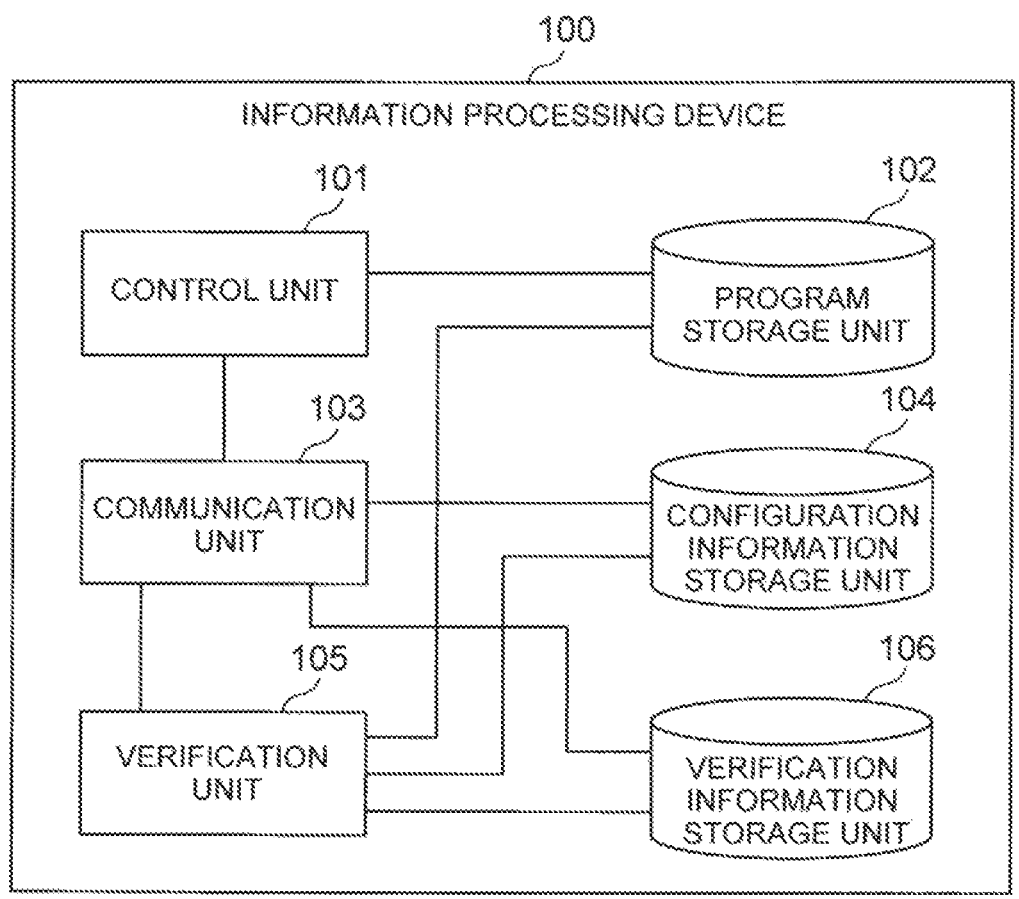
FIG. 2 It depicts a block diagram illustrating a configuration example of an information processing device according to a first example embodiment.

FIG. 2 is a block diagram illustrating a configuration example of the information processing device 100 of the first example embodiment. The information processing device 100 comprises a control unit 101, a program storage unit 102, a communication unit 103, a configuration information storage unit 104, a verification unit 105, and a verification information storage unit 106.

The control unit 101 is a control device that performs overall control and computational processing of the information processing device 100. The program storage unit 102 stores a program executed by the control unit 101. The communication unit 103 communicates with a connection destination device through a network (not shown) such as the Internet.

The configuration information storage unit 104 stores information that can identify the information processing device 100 belonging to a cluster including the own information processing device (the information processing device 100 including the configuration information storage unit 104), and information that can identify the information processing device 100 belonging to a cluster adjacent to this cluster. Each of the information processing devices 100 is identified using identification information such as a unique identification (ID), a fixed Internet protocol (IP) address, and a media access control (MAC) address. In order to prevent spoofing of the information processing device 100, authentication information such as a common encryption key and certificate information may be added to the identification information.

The cluster stored in the configuration information storage unit 104 is configured by, for example, the administrator 130 of the entire system. The administrator 130 can configure a plurality of clusters by dividing an information processing device group (all the information processing devices 100) based on a certain index such that the maximum length of a distance between two arbitrary information processing devices 100 in each cluster. Examples of the index include a distance such as a number of hops in a network layer between the information processing devices 100 and a physical distance. In addition, the administrator 130 can also configure a plurality of clusters by dividing the information processing device group such that a number of the information processing devices 100 is uniform.

In addition, the administrator 130 creates a first connected graph indicating a connection relationship between configured clusters and a second connected graph indicating a connection relationship between the information processing devices 100 in the respective clusters. Information representing the information processing devices 100, which correspond to nodes at both ends of edges of these connected graphs (the first connected graph and the second connected graph) is transmitted as configuration information to the information processing devices 100 corresponding to both the nodes. For example, a connection relationship between the information processing devices 100 representing clusters is used to create the first connected graph (connected graph indicating the connection relationship between clusters). When the communication unit 103 receives the configuration information in the information processing device 100, the configuration information storage unit 104 stores the configuration information. For example, in a case where these connected graphs are configured using a spanning tree structure, a number of edges is minimized, and the storage capacity of the configuration information storage unit 104 is reduced. For example, a number of hops of a network between two arbitrary points is considered as cost, and it is possible to obtain the minimum-cost spanning tree structure using the Kruskal method or the Prim method which is an already-known algorithm.

In addition, in a case where a connection has a complete graph structure, it is possible to increase communication failure tolerance between the respective information processing devices 100 and to reduce the number of verification steps (the number of verification processes). Regarding the second connected graph, a complete graph is realized by storing information of all the information processing devices 100 belonging to the same cluster in each of the information processing devices 100. Regarding the first connected graph, a complete graph is obtained as one or more representative information processing devices 100 are selected for the respective clusters, and the selected information processing devices 100 collect information of the representative information processing device 100 of another cluster.

The verification information storage unit 106 stores an eigenvalue (hereinafter, also referred to as a first value) as a first value of the other information processing device 100 calculated in advance. As the first value, it is possible to use an index value which can be calculated from an entity (for example, binary data) of a program stored in the program storage unit 102 and with which the presence or absence of tampering can be confirmed. As the index value, for example, a hash value, a checksum, or a value of an error correcting code can be used.

In addition, the entity itself of the program can be used as the first value. As the first value, the first value can be recalculated and used if necessary. For example, assumed is a malicious program spoofing a regular program by storing the correct first value. Then, as an example, an eigenvalue calculated by adding a random bit string to the entity itself of the program is used as the first value. Any index to be used is determined by the administrator 130 depending on a method handled by the verification unit 105. In addition, the information processing device 100 in which the first value of the other information processing device 100 should to be stored is determined by the administrator 130.

When receiving the verification request, the verification unit 105 newly calculates an eigenvalue (hereinafter, also referred to as a second value) as a second value based on a program stored in the program storage unit 102 of the own information processing device (the information processing device including the verification unit 105) 100. In addition, the verification unit 105 transmits the verification request to the other information processing devices 100. Further, the verification unit 105 aggregates verification results received from the other information processing devices 100. A series of verification requests are assigned with a single unique number. The verification unit 105 stores unique numbers as a "verified list" when each of the information processing devices 100 completes verification. The unique number is used to determine whether verification has been completed. As an example, the verified list is configured to be capable of storing a predetermined number of unique numbers. The unique numbers in the verified list are removed from the oldest one.

The communication unit 103 transmits the verification request to the other information processing devices 100 to the information processing device 100 identified by the configuration information storage unit 104. When receiving a response to the transmitted verification request, the verification unit 105 verifies and aggregates a content of the response. The response includes identification information of the information processing device 100 of a verification request destination and the second value in the information processing device 100. The response may include a verification result of another information processing device aggregated by the verification request destination. The verification unit 105 determines whether the verification is successful by confirming whether the received second value matches the first value stored in the verification information storage unit 106.

In addition, the verification unit 105 aggregates a verification result of the other information processing device 100. When aggregating the verification result, the verification unit 105 aggregates identification information of the information processing device 100 to be verified and the success or failure of the verification. The verification unit 105 may simply aggregate only the number of information processing devices 100 that have succeeded in verification and the number of information processing devices 100 that have failed in verification. The verification unit 105 may prevent tampering by adding a signature of the information processing device 100 that has performed verification to each response. Thereafter, the verification unit 105 transmits the second value and the aggregated verification result to a verification request source.

In a case where the information processing device 100 has a secure storage area or a secure execution environment protected in hardware, the verification unit 105 and the verification information storage unit 106 may be laid out in the secure storage area or the secure execution environment. For example, a storage area in an integrated circuit (IC) chip such as a trusted platform module (TPM) and a secure element corresponds to the secure storage area. A trusted execution environment (TEE), which is a secure program execution environment such as the Intel Software Guard Extensions (SGX: Intel is a registered trademark) or ARM TrustZone (registered trademark) and a secure storage area prepared by the TEE correspond to the secure execution environment.

Figure 3:
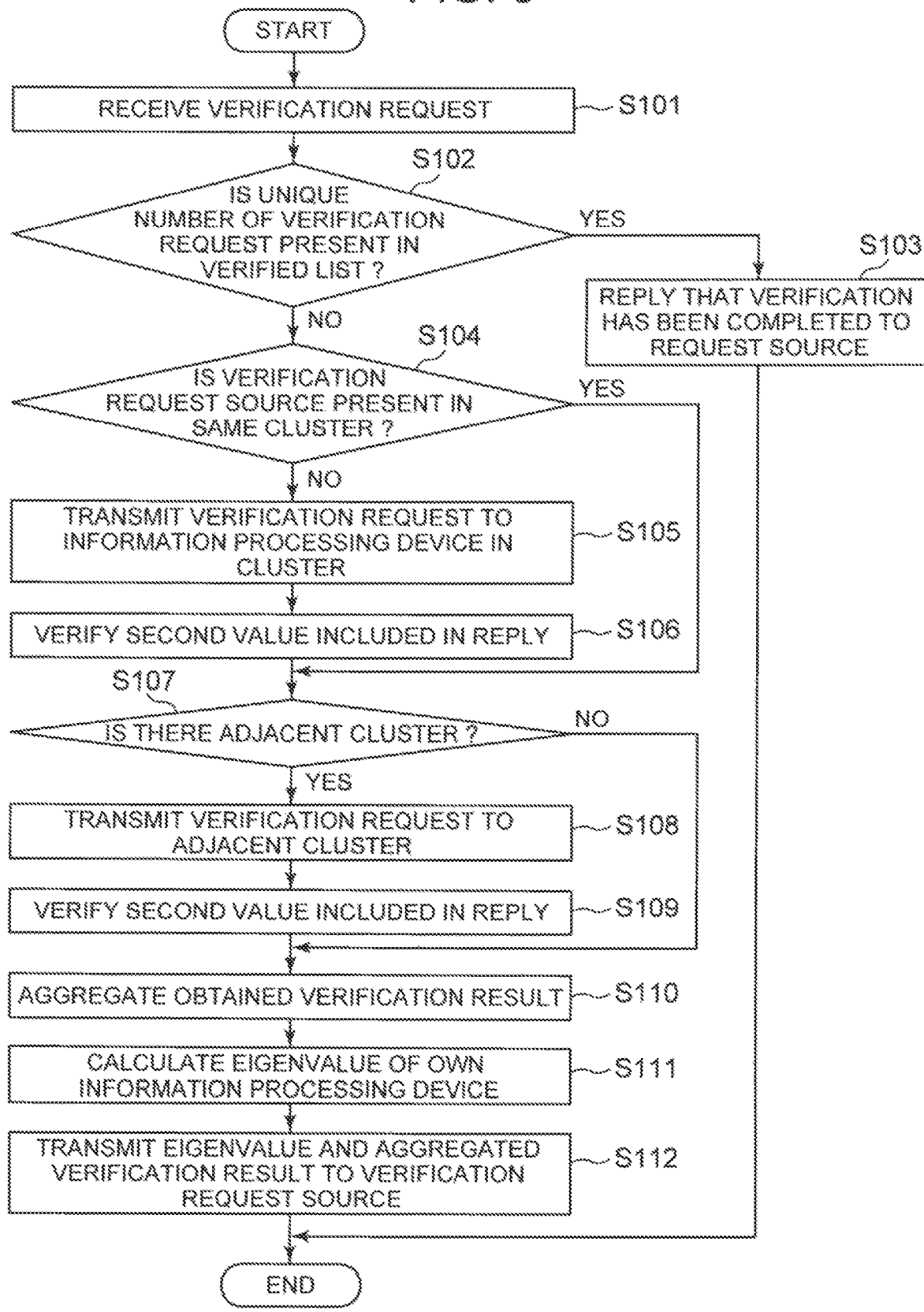
FIG. 3 It depicts a flowchart illustrating verification processing executed by the information processing device according to the first example embodiment.

Next, the operation of the information processing device 100 of the present example embodiment will be described. FIG. 3 is a flowchart illustrating verification processing executed by the verification unit 105 in the information processing device 100.

The verification processing is started when a verification request is received from the outside (Step S101). In the information processing device 100 that has received the verification request, the verification unit 105 determines whether verification has been completed based on whether a unique number of the verification request is registered in a verified list (Step S102). When the verification has been completed, the verification unit 105 replies that verification has been completed to a verification request source (device that has transmitted the verification request) through the communication unit 103 (Step S103), and ends the processing.

When the verification has not been completed, the verification unit 105 determines whether the transmission source (request source) of the verification request is the information processing device 100 (or the verification request source 120) in a cluster to which the own information processing device 100 belongs based on information stored in the configuration information storage unit 104 (Step S104). When the request source is the information processing device 100 in the cluster, the processing proceeds to Step S107. When the request source is the information processing device 100 outside the cluster, the verification unit 105 transmits a verification request to the information processing device 100 in the cluster through the communication unit 103 (Step S105). When receiving a response (reply) to the transmitted verification request, the verification unit 105 compares a second value included in the reply with the first value stored in the verification information storage unit 106 to determine whether the verification is successful (Step S106). Then, the processing proceeds to Step S107. It should be noted that, in a case where the first value and the second value match, the verification unit 105 determines that the verification is successful, that is, there is no illegality related to a program in the information processing device 100 that has replied.

In Step S107, the verification unit 105 determines whether there is an adjacent cluster based on information stored in the configuration information storage unit 104. When there is no adjacent cluster, the processing proceeds to Step S110. When there is an adjacent cluster, the verification unit 105 transmits a verification request to the adjacent cluster through the communication unit 103 (Step S108). When receiving a response (reply) to the transmitted verification request, the verification unit 105 compares a second value included in the reply with the first value stored in the verification information storage unit 106 to determine whether the verification is successful (Step S109). Specifically, in a case where the first value and the second value match, the verification unit 105 determines that the verification is successful, that is, there is no illegality related to a program in the information processing device 100 that has replied. Then, the processing proceeds to Step S110.

In Step S110, the verification unit 105 aggregates verification results obtained in the process of Step S106 and the process of Step S109 and a verification results sent from the other information processing device 100. In addition, the verification unit 105 calculates an eigenvalue based on a program stored in the program storage unit 102 in the own information processing device 100 (Step S111). Then, the verification unit 105 transmits the calculated eigenvalue together with the verification result of the other information processing device 100 to the verification request source (Step S112), and ends the process. The eigenvalue is received by the information processing device 100 which is the verification request source. The information processing device 100 handles the received eigenvalue as the second value.

It should be noted that, in a case where the processes in Steps S105, S106, S108, and S109 have not been executed, the verification unit 105 does not execute the process of Step S110. In such a case, the verification unit 105 transmits only the eigenvalue related to the own information processing device 100 without transmitting the verification result of the other information processing device 100 in the process of Step S112.

As explained above, in the present example embodiment, the information processing devices 100 transfer the verification requests to each other, so that verification between the information processing device 100 and the other information processing device 100 connected thereto is executed in a distributed manner. Therefore, it is possible to prevent an increase in verification information to be held by a device that performs verification and prevent the concentration of access to one storage unit as compared with a case where a single monitoring device monitors all devices in a system.

Second Example Embodiment

Figure 4:
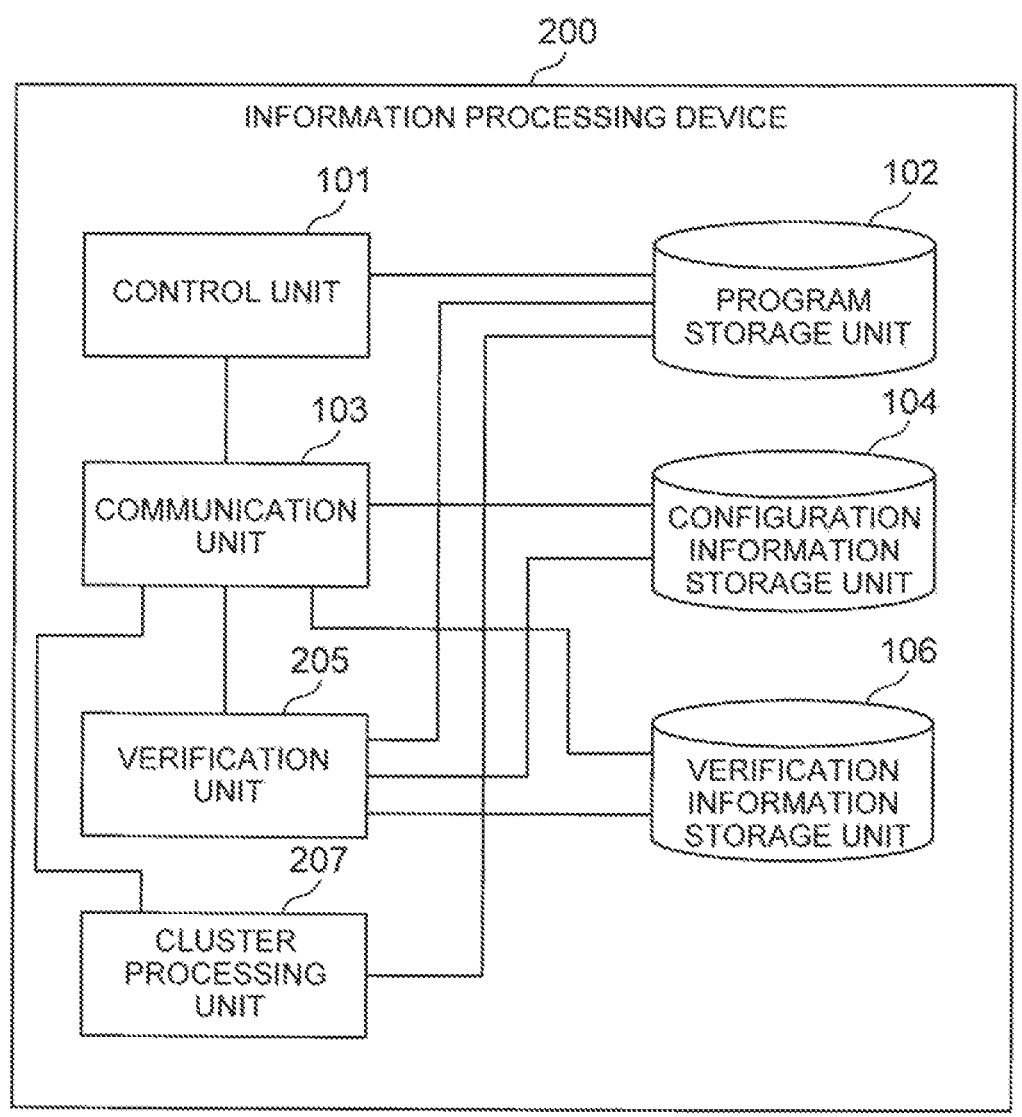
FIG. 4 It depicts a block diagram illustrating a configuration example of an information processing device according to a second example embodiment.

FIG. 4 is a block diagram illustrating a configuration example of an information processing device 200 of a second example embodiment. The information processing device 200 comprises the control unit 101, the program storage unit 102, the communication unit 103, the configuration information storage unit 104, a verification unit 205, the verification information storage unit 106, and a cluster processing unit 207.

The control unit 101 and the communication unit 103 illustrated in FIG. 4 have functions similar to those in the first example embodiment. A function of the verification unit 205 is different from the function of the verification unit 105 in the first example embodiment.

In the second example embodiment, the information processing devices 200 having the same program recorded in the program storage units 102 are the information processing devices 200 belonging to the same cluster. That is, verification information on the information processing device 200 in the same cluster stored in the verification information storage unit 106 is reduced using the identity of the program.

An example of a system including the information processing device 200 is the system as shown in FIG. 1. However, each of the information processing devices 100 in FIG. 1 is replaced with the information processing device 200.

The cluster processing unit 207 calculates an eigenvalue from the program stored in the program storage unit 102 in the own information processing device (the information processing device including the cluster processing unit 207) 200, and makes a response to an eigenvalue request from the outside.

The administrator 130 makes an eigenvalue request to the cluster processing unit 207 of each of the information processing devices 200, and configures a cluster of the information processing devices 200 based on the obtained eigenvalue (corresponding to a first value). A first connected graph and a second connected graph are created for the configured cluster and transmitted to each of the information processing devices 200. The configuration information storage unit 104 of the information processing device 200 stores configuration information. Specifically, the administrator 130 transmits the eigenvalue request and the configuration information through, for example, a server handled by the administrator 130 or the like, and receives the eigenvalue.

The verification unit 205 executes verification processing (refer to FIG. 3) similar to that of the verification unit 105 in the first example embodiment. However, in the present example embodiment, the verification unit 205 determines whether verification is successful by comparing a second value, included in a response to a verification request obtained from the other information processing device 200 (the information processing device 200 other than the information processing device 200 including the verification unit 205) in the same cluster with the first value calculated in advance from the program stored in the program information storage unit 102 in the own information processing device 200 in the process of Step S106. In a case where the first value and the second value match, the verification unit 205 determines that the verification is successful, that is, there is no illegality related to a program in the information processing device 200 that has replied. It should be noted that, in the information processing device 200 that executes the verification processing in the present example embodiment, the first value may be stored in the verification information storage unit 106 in advance, or may be calculated by the verification unit 205 every time the second value is received from the other information processing device 200.

In the present example embodiment, the verification unit 205 can perform the verification as described above because the programs stored in the program storage units 102 of all the information processing devices 200 belonging to the same cluster are the same.

FIG. 5 is a flowchart illustrating a cluster configuration method. This processing is executed by the administrator 130 (specifically, a server handled by the administrator 130 or the like).

The administrator 130 requests eigenvalues as first values from all the information processing devices 200 (Step S201). In the information processing device 200 that has received an eigenvalue request, the cluster processing unit 207 calculates the eigenvalue of a program. The cluster processing unit 207 sends the eigenvalue to the administrator 130 through the communication unit 103. In this manner, the administrator 130 can collect eigenvalues of all the information processing devices 200. The administrator 130 determines the identity between the programs by comparing the collected eigenvalues. The administrator 130 configures a cluster of the same eigenvalue (Step S202). That is, the administrator 130 causes the information processing devices 200 having the programs determined to be the same to be included in the same cluster.

Next, the administrator 130 configures a spanning tree connecting clusters as a first connected graph (Step S203). In addition, the administrator 130 configures a spanning tree in a cluster as a second connected graph (Step S204). Information representing the information processing devices 200 corresponding to nodes at both ends of edges of the connected graphs (the first connected graph and the second connected graph) are transmitted to each of the information processing devices 200 (Step S205), and the processing ends. The administrator 130 transmits the information to the information processing devices 200 corresponding to both the nodes as configuration information. When the communication unit 103 receives the configuration information in the information processing device 200, the configuration information storage unit 104 stores the configuration information. It should be noted that the Kruskal method or the Prim method, which is an algorithm for obtaining a minimum spanning tree based on a number of hops between information processing devices, can be used as a method for forming the spanning tree.

The information processing device 200 of the present example embodiment does not necessarily store the first values of the information processing devices 200 in the same cluster in the verification information storage unit 106. Therefore, the verification information to be held by the verification information storage unit 106 can be further reduced.

Incidentally, the cluster processing unit 207 is provided separately from the verification unit 205 in the present example embodiment, but the verification unit 205 may function as the above-described cluster processing unit 207 without providing the cluster processing unit 207.

Third Example Embodiment

In the present example embodiment, the information processing devices 200 having similar programs recorded in the program storage units 102 are the information processing devices 200 belonging to the same cluster. That is, the storage capacity of the verification information storage unit 106 for verification in the same cluster is reduced using a similarity of a program.

A configuration of the information processing device 200 of the present example embodiment is the same as the configuration shown in FIG. 4.

In order to calculate the similarity of the program, the administrator 130 defines a Hamming distance based on binary values of programs, a value of a fuzzy hash of a program, and the like as an index (index value) of the similarity between programs. The administrator 130 (specifically, a server handled by the administrator 130 or the like) determines whether programs are similar using the index value and a predetermined threshold. For example, when the index value exceeds the predetermined threshold, it is determined that the programs are similar. The index value of the similarity may be simply expressed as a similarity.

FIG. 6 is a flowchart illustrating a cluster configuration method in the present example embodiment. This processing is executed by the administrator 130 (specifically, a server handled by the administrator 130 or the like).

The administrator 130 requests an index value of a similarity of a program from all the information processing devices 200 (Step S301). In the information processing device 200 that has received the request for the index value, the cluster processing unit 207 calculates the index value. The cluster processing unit 207 sends the index value to the administrator 130 through the communication unit 103. In this manner, the administrator 130 can collect index values of similarities of all the information processing devices 200. The administrator 130 determines the similarity of the program by comparing the collected index values. The administrator 130 causes the information processing devices 200 having the close similarity to be included in the same cluster (Step S302). Thereafter, the processes of Steps S203 to S205 are executed similarly to the case of the second example embodiment.

The verification information storage unit 106 stores a similarity threshold or difference information between programs as verification information (corresponding to a first value) for the other information processing device 200 in the same cluster. Which verification information is to be used is determined by the administrator 130 depending on a method of the verification unit 205.

The verification unit 205 executes verification processing (refer to FIG. 3) similarly to the verification unit 105 in the first example embodiment, but in the process of Step S106, performs verification using a similarity with a program in the own information processing device 200 or difference information based on a verification response obtained from the other information processing device 200 in the same cluster.

In the present example embodiment, the verification unit 205 calculates an index value of the above similarity between programs as a second value handled by a verification request source in the process of Step S111.

Specifically, in a case where the verification is performed based on the similarity, the verification unit 205 calculates a similarity between the second value (the index value of the similarity in the present example embodiment) included in the verification response and the first value calculated in advance from the program in the own information processing device 200. Then, the verification unit 205 determines whether the verification is successful by determining whether the obtained similarity exceeds the threshold. Specifically, when the obtained similarity exceeds the threshold, the verification unit 205 determines that the verification is successful, that is, there is no illegality related to a program in the information processing device 200 that has replied. In the case of using the difference information, the verification unit 205 performs a comparison with the program in the own information processing device 200 for the same portion, and determines whether the verification is successful using the difference information for different portions. That is, when a difference is equal to or less than a predetermined degree, the verification unit 205 determines that there is no illegality related to the program in the information processing device 200 that has replied.

In the present example embodiment, the verification unit 205 can perform the verification as described above because the programs stored in the program storage units 102 of all the information processing devices 200 belonging to the same cluster are similar.

In the case where the verification unit 205 executes verification based on the similarity, the presence or absence of tampering of a program is partially verified in the present example embodiment. In the case where the verification unit 205 executes verification using the difference information, the presence or absence of tampering of a program is verified. It should be noted that the verification unit 205 may include a similarity value used for verification and the like in a verification result as a response to a verification request.

As described above, the information processing device 200 of the present example embodiment does not necessarily store verification information of each of the information processing devices 200 in the same cluster in the verification information storage unit 106. The verification information storage unit 106 only needs to store one similarity threshold or the difference information between programs of all the information processing devices 200 in the same cluster. Therefore, the verification information to be held by the verification information storage unit 106 can be further reduced.

Fourth Example Embodiment

In the present example embodiment, the information processing devices 200 having similar program attributes recorded in the program storage units 102 are the information processing devices 200 belonging to the same cluster. That is, the storage capacity of the verification information storage unit 106 for verification in the same cluster is reduced using an attribute of a program.

A configuration of the information processing device 200 of the present example embodiment is the same as the configuration shown in FIG. 4.

The administrator 130 (specifically, a server handled by the administrator 130 or the like) acquires information such as a program name and a signature of a developer and version information of a program in order to find an attribute of the program. Then, the administrator 130 determines that programs by the same developer or programs which correspond to the same program in different versions are programs having similar attributes. It should be noted that signature information of a program developer may be used to prevent tampering of the program attribute.

The verification information storage unit 106 stores an attribute of a verification target program as verification information for the other information processing device 200 in the same cluster. Which type of attribute is to be used is determined by the administrator depending on a method of the verification unit 205.

FIG. 7 is a flowchart illustrating a cluster configuration method in the present example embodiment. This processing is executed by the administrator 130 (specifically, a server handled by the administrator 130 or the like).

The administrator 130 requests attributes of programs as first values from all the information processing devices 200 (Step S401). In the information processing device 200 that has received the request, the cluster processing unit 207 extracts the attribute of the program. The cluster processing unit 207 transmits the attribute of the program to the administrator 130 through the communication unit 103. In this manner, the administrator 130 can collect the attributes of the programs of all the information processing devices 200. The administrator 130 includes the information processing devices 200 having similar (or matching) program attributes in the same cluster (Step S402). Thereafter, the processes of Steps S203 to S205 are executed similarly to the case of the second example embodiment.

The verification unit 205 executes verification processing (refer to FIG. 3) similarly to the verification unit 105 in the first example embodiment, but confirms whether an attribute of a program in the own information processing device 200 is similar to (or matches) an attribute of a program in the other information processing device 200 using a verification response obtained from the other information processing device 200 in the same cluster and the attribute (corresponding to the first value) of the program stored in the verification information storage unit 106 in the process of Step S106. If the both are similar (or match), the verification unit 205 determines that the verification is successful, that is, there is no illegality related to the program in the information processing device 200 that has replied.

In addition, the verification unit 205 reads an attribute of a program from the verification information storage unit 106 and sets the read attribute as the second value handled by a verification request source in the process of Step S111 in the present example embodiment.

As described above, the information processing device 200 of the present example embodiment does not necessarily store verification information of each of the information processing devices 200 in the same cluster in the verification information storage unit 106. The verification information storage unit 106 only needs to store the attributes of the programs for all the information processing devices 200 in the same cluster. Therefore, the verification information to be held by the verification information storage unit 106 can be further reduced.

Fifth Example Embodiment

Figure 8:
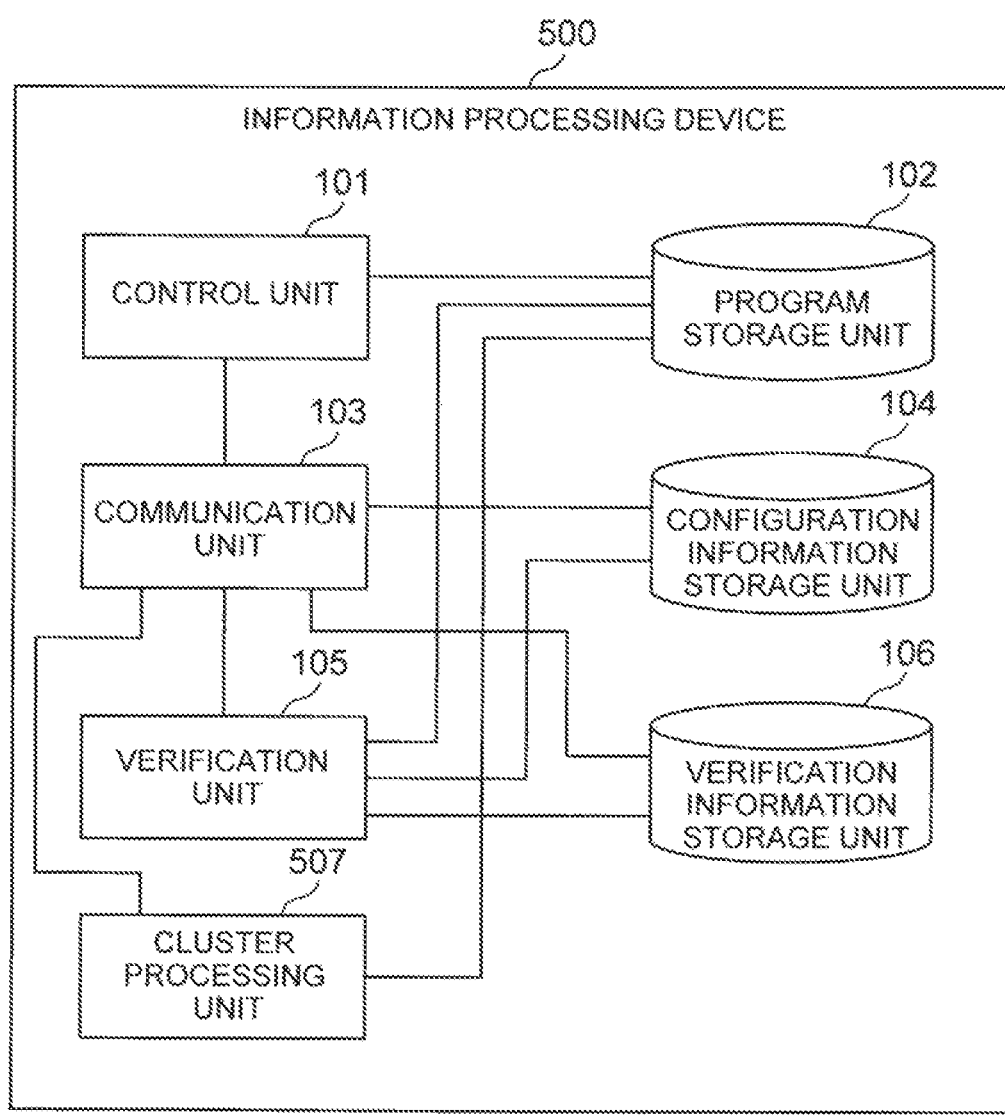
FIG. 8 It depicts a block diagram illustrating a configuration example of an information processing device according to a fifth example embodiment.

FIG. 8 is a block diagram illustrating a configuration example of an information processing device of a fifth example embodiment. An information processing device 500 comprises the control unit 101, the program storage unit 102, the communication unit 103, the configuration information storage unit 104, the verification unit 105, the verification information storage unit 106, and a cluster processing unit 507.

The control unit 101, the communication unit 103, and the verification unit 105 illustrated in FIG. 8 have functions similar to those in the first example embodiment.

In the present example embodiment, a cluster is configured in a distributed manner in the system without the administrator 130 being involved in the configuration of the cluster.

An example of a system including the information processing device 100 is the system as shown in FIG. 1. However, each of the information processing devices 100 in FIG. 1 is replaced with the information processing device 500.

The cluster processing unit 507 in a certain information processing device 500 in the system autonomously configures a cluster. The cluster processing unit 507 configures a first connected graph and a second connected graph. The cluster processing unit 507 stores configuration information in the configuration information storage unit 104. Then, the cluster processing unit 507 requests an eigenvalue from the adjacent information processing device 500 based on the configuration information. When the adjacent information processing device 500 transmits the eigenvalue in response to the request, the eigenvalue is received by the communication unit 103 and stored in the verification information storage unit 106 as a first value.

The cluster processing unit 507 can use a clustering method used in a distributed system as a cluster configuration method. For example, the cluster processing unit 507 calculates cost based on a number of hops of a network. If the system is a wireless network, the cluster processing unit 507 calculates the cost based on signal intensity. The cluster processing unit 507 can configure a cluster by comparing the calculated cost with a predetermined threshold. As an example, the cluster processing unit 507 configures the cluster by obtaining a spanning tree that minimizes the cost.

In addition, it is also possible to select a representative node (the information processing device 500 in charge of processing for the cluster configuration) by using a leader election algorithm and entrust the representative node with a role of an administrator. In this case, the selected leader (representative node) collects pieces of information of all nodes (all the information processing devices 500). Then, the leader configures a first connected graph and a second connected graph based on a distance such as the number of hops between nodes. The leader transmits a unique ID of an adjacent node to each node based on configuration information (the first connected graph and the second connected graph). In each node, the configuration information storage unit 104 stores the received ID. It should be noted that selection of a representative node may be performed again to select a leader for each cluster regarding the configuration of the second connected graph. In this case, the selected leader calculates a second connected graph and transmits information of an adjacent node to each node.

As described above, the cluster is autonomously configured in the system including the information processing device 500 of the present example embodiment. Therefore, it is unnecessary for the administrator 130 to intensively manage information of a large number of information processing devices 500.

Sixth Example Embodiment

In the present example embodiment, one verification server is arranged in each cluster, and verification processing is performed by an information processing device and a verification server.

Figure 9:
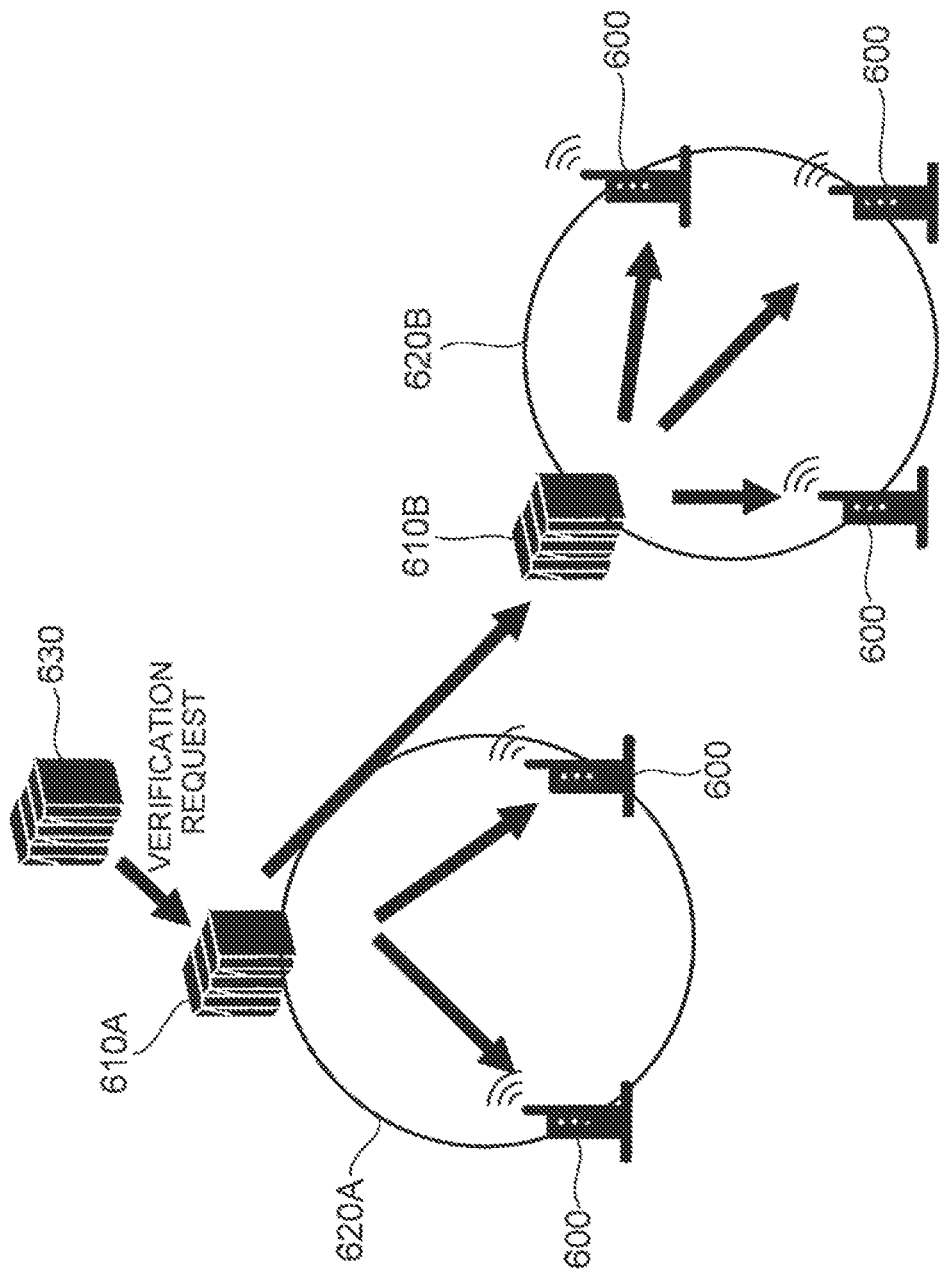
FIG. 9 It depicts an explanatory diagram illustrating an example of a system including an information processing device.

FIG. 9 is an explanatory diagram illustrating an example of a system including the information processing device of the present example embodiment. In the example illustrated in FIG. 9, a cluster 620A includes one verification server 610A in addition to a plurality of information processing devices 600. A cluster 620B includes a verification server 610B in addition to a plurality of information processing devices 600. A verification request is transmitted from a verification request source 630 to any one of the verification servers. In the example shown in FIG. 9, the verification request is transmitted to the verification server 610A. The verification server 610A, which receives the verification request, transmits the verification request to the information processing device 600 in the cluster 620A. In addition, the verification server 610A transmits the verification request to the verification server 620B of the adjacent cluster 610B. Then, verification processing of the entire system is performed. It should be noted that the verification request source 630 is specifically, for example, a server. In addition, the specific information processing device 600 and the verification server 610A or the verification server 610B can also start a verification request to another verification server in the present example embodiment.

Figure 10:
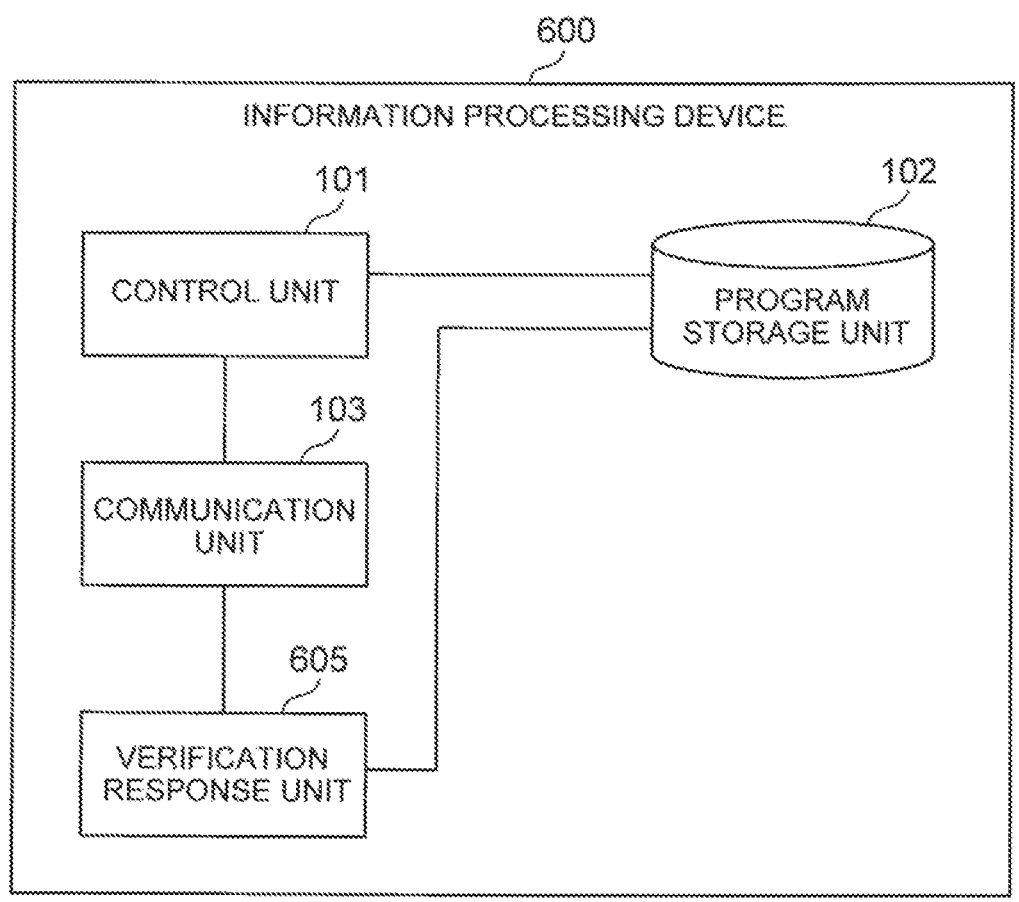
FIG. 10 It depicts a block diagram illustrating a configuration example of an information processing device according to a sixth example embodiment.

FIG. 10 is a block diagram illustrating a configuration example of the information processing device 600 of the present example embodiment. The information processing device 600 comprises the control unit 101, the program storage unit 102, the communication unit 103, and a verification response unit 605.

The control unit 101 and the communication unit 103 illustrated in FIG. 10 have functions similar to those in the first example embodiment.

The verification response unit 605 newly calculates a second value from a program stored in the program storage unit 102 in the own information processing device (information processing device including the verification response unit 605) 600, and makes a response to a verification request. A unique number is assigned to each verification request. The unique number is used to determine whether verification has been completed.

Figure 11:
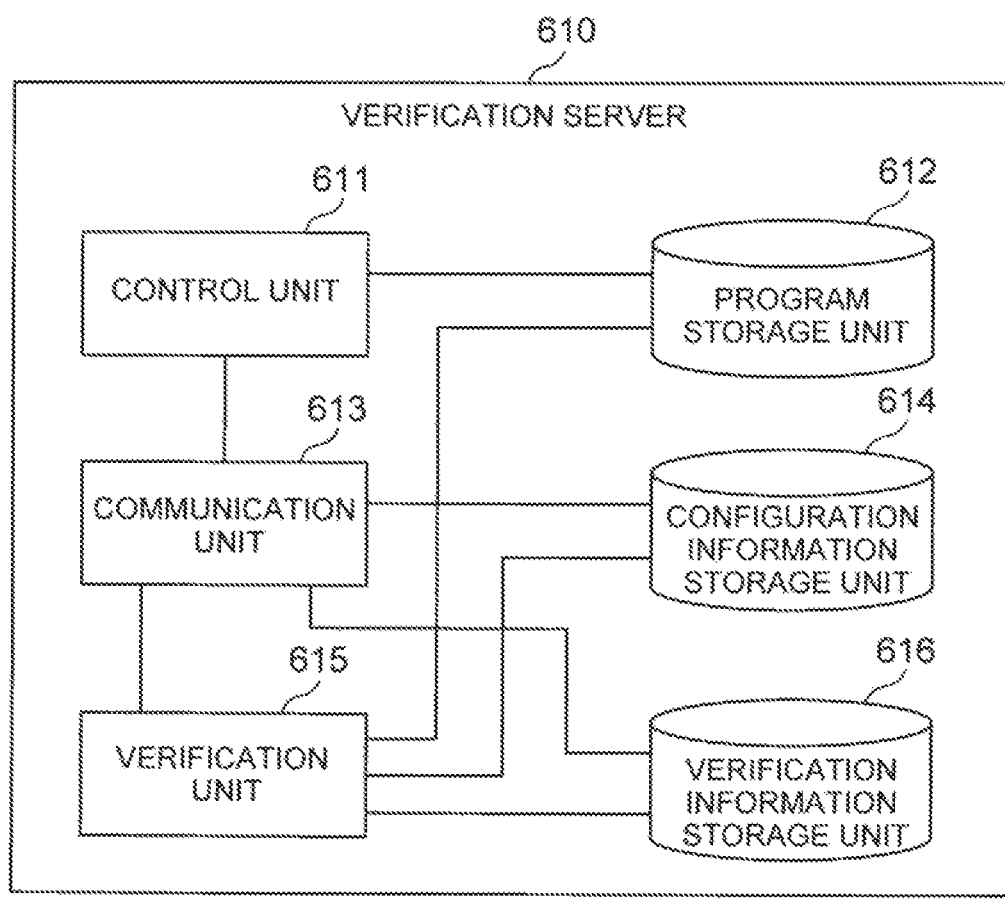
FIG. 11 It depicts a block diagram illustrating a configuration example of a verification server.

FIG. 11 is a block diagram illustrating a configuration example of the verification server 610. The verification server 610 comprises a control unit 611, a program storage unit 612, a communication unit 613, a configuration information storage unit 614, a verification unit 615, and a verification information storage unit 616. Configurations of the verification server 610A and the verification server 610B shown in FIG. 9 are the same as the configuration of the verification server 610. In other words, the verification server 610 is illustrated in FIG. 11 in order to describe the configurations of the verification server 610A and the verification server 610B.

The communication unit 613 communicates with a connection destination device through a network (not shown) such as the Internet. The verification unit 615 newly calculates a second value from a program stored in the program storage unit 612 in the own device (the verification server 610). The verification unit 615 transmits a verification request to the information processing device 600 through the communication unit 613. In addition, the verification unit 615 makes a response to a verification request source based on a verification result. A unique number is assigned to each verification request. The unique number is used to determine whether verification has been completed. When transmitting the verification request to the information processing device 600, the verification unit 615 transmits the verification request, referring to information that can identify the information processing device 600 stored in the configuration information storage unit 614.

In addition, the verification unit 615 compares the second value included in the verification response received from the information processing device 600 with a first value included in the verification information storage unit 616 to determine whether the verification is successful. Specifically, in a case where the first value and the second value match, the verification unit 615 determines that the verification is successful, that is, there is no illegality related to a program in the information processing device 600 that has replied. In addition, the verification result of the information processing device 600 included in the verification response is aggregated. After verifying the responses of all the verification requests and calculating the own second value, the verification unit 615 transmits these results to the verification request source 630.

Figure 12:
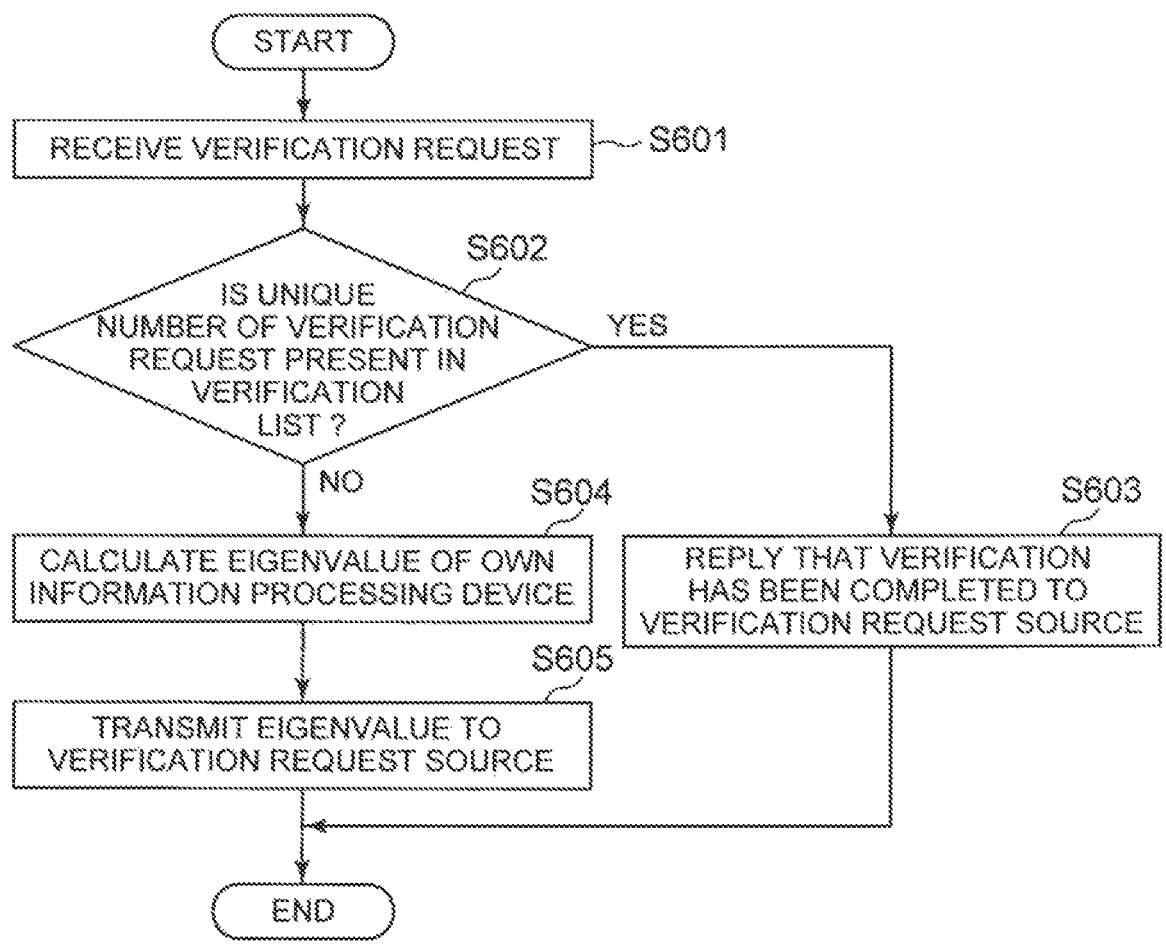
FIG. 12 It depicts a flowchart illustrating verification processing executed by the information processing device according to the sixth example embodiment.

Next, the operation of the information processing device 600 of the present example embodiment will be described. FIG. 12 is a flowchart illustrating verification processing executed by the verification response unit 605 in the information processing device 600.

The verification processing is started when a verification request is received from the outside (Step S601). When receiving the verification request, the verification response unit 605 in the information processing device 600 determines whether verification has been completed based on whether a unique number of the verification request is registered in a verified list (Step S602). When the verification has been completed, the verification response unit 605 replies that verification has been completed to a verification request source (device that has transmitted the verification request) through the communication unit 103 (Step S603), and ends the processing.

When the verification has not been completed, the verification response unit 605 calculates an eigenvalue based on information stored in the program storage unit 102 in the own information processing device 600 (Step S604). The verification response unit 605 transmits the eigenvalue to the verification request source (Step S605). Then, the processing ends. The eigenvalue is received by the verification server 610 (the verification servers 610A, 610B). The verification server 610 handles the received eigenvalue as a second value.

Figure 13:
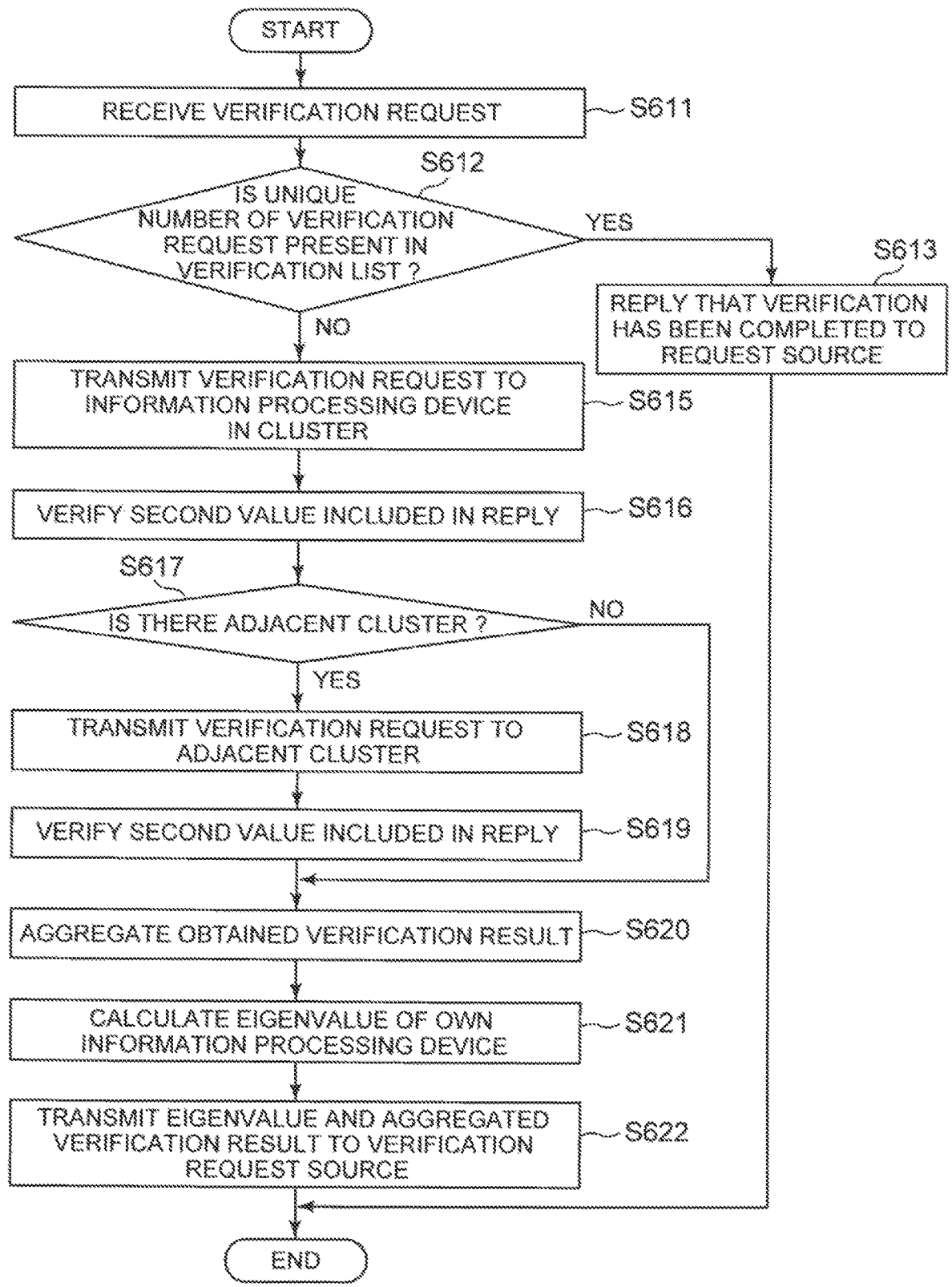
FIG. 13 It depicts a flowchart illustrating verification processing executed by a verification unit of the verification server.

Next, an operation of the verification server 610, that is, operations of the verification servers 610A, 610B will be described. FIG. 13 is a flowchart illustrating verification processing executed by the verification unit 615 of the verification server 610.

The verification processing is started when a verification request from the outside or a verification request generated by the own control unit 611 is received (Step S611). When receiving the verification request, the verification unit 615 in the verification server 610 determines whether verification has been completed based on whether a unique number of the verification request is registered in a verified list (Step S612). When the verification has been completed, the verification unit 615 replies that verification has been completed to a verification request source (verification server that has transmitted the verification request) through the communication unit 613 (Step S613), and ends the processing.

When the verification has not been completed, the verification unit 615 transmits a verification request to the information processing device 600 in the cluster (Step S615). When receiving a response (reply) to the transmitted verification request, the verification unit 615 compares a second value included in the reply with a first value stored in the verification information storage unit 616 to determine whether the verification is successful (Step S616). Specifically, in a case where the first value and the second value match, the verification unit 615 determines that the verification is successful, that is, there is no illegality related to a program in the information processing device 600 that has replied.

Next, the verification unit 615 determines whether there is an adjacent cluster based on information stored in the configuration information storage unit 614 (Step S617). When there is no adjacent cluster, the processing proceeds to Step S620. When there is an adjacent cluster, the verification unit 615 transmits a verification request to the verification server 610 of the adjacent cluster (Step S618). The verification unit 615 compares a second value in a response content with a first value of the verification information storage unit 616 to determine whether the verification is successful (Step S619). Specifically, in a case where the first value and the second value match, the verification unit 615 determines that the verification is successful, that is, there is no illegality related to a program in the information processing device 600 in the adjacent cluster. It should be noted that the verification server of the adjacent cluster is the verification server 610B in a case where the verification server 610 that transmits the verification request is the verification server 610A when referring to FIG. 9. In a case where the verification server 610 that transmits the verification request is the verification server 610B, the verification server of the adjacent cluster is the verification server 610A.

Then, in Step S620, the verification unit 615 aggregates verification results obtained in the processing in Step S616 and the processing in Step S619, and verification results transmitted from the information processing device 600 and the other verification server 610 (Step S620). In addition, the verification unit 615 calculates an eigenvalue related to the program stored in the program storage unit 612 (Step S621). The verification unit 615 transmits the calculated eigenvalue together with the verification result of the other information processing device to the verification request source through the communication unit 613 (Step S622), and ends the processing. The eigenvalue is received by the verification server 610 (the verification servers 610A and, 610B) or the verification request source 630. The verification server 610 or the verification request source 630 handles the received eigenvalue as the second value.

As described above, in the present example embodiment, the information processing device 600 and the verification server 610 transfer the verification requests to each other, so that verification among the verification server 610, the other information processing device 600 connected thereto, and the other verification server 610 is executed in a distributed manner. Therefore, it is possible to prevent an increase in verification information and the concentration of access to one storage unit.

It should be noted that it is also possible to employ an example embodiment in which some configurations of any one of the example embodiments are added to another example embodiment or replaced with some configuration of another example embodiment.

The same verification method is used for all clusters in each of the above example embodiment, but the verification method may be changed for each cluster as an example. For example, the second example embodiment may be adopted for a cluster including the information processing devices 100 in which the same program is stored in the program storage units 102, and another example embodiment may be adopted for the other clusters.

In addition, clusters are configured such that verification between information processing devices in a cluster and verification between adjacent clusters are performed in each of the above example embodiments, but more-layered cluster configuration may be constructed by further clustering one cluster. In such a case, the verification processing in each of the above example embodiments may be realized by regarding the cluster as one information processing device. For example, one cluster among a plurality of clusters having a more-layered structure is regarded as a cluster that transmits a verification request to another information processing device or cluster.

Although the components in the above exemplary embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above exemplary embodiments may be realized by a computer having a processor such as a central processing unit (CPU), a memory, etc. For example, a program for performing the method (processing) in the above exemplary embodiments may be stored in a storage device (storage medium), and the functions may be realized with the CPU executing the program stored in the storage device.

Figure 14:
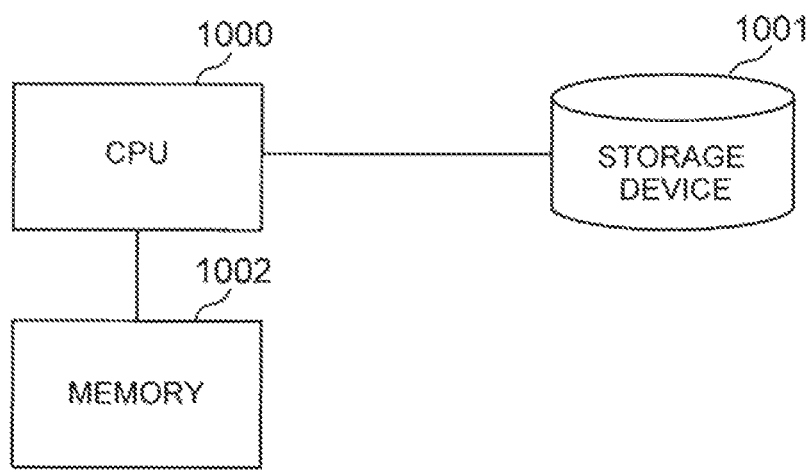
FIG. 14 It depicts a block diagram illustrating an example of a computer having a CPU.

FIG. 14 is a block diagram illustrating an example of the computer having the CPU. The computer can be mounted on the information processing devices 100, 200, 500, 600 and can be mounted on the verification server 610. The CPU 1000 executes processing in accordance with a program stored in a storage device 1001 to realize the functions in the above exemplary embodiments. That is to say, the functions of the control unit 101, the software part of the communication unit 103, the verification units 105 and 205, the cluster processing units 207 and 507, and the verification response unit 605 in the information processing devices 100, 200, 500, and 600 shown in FIGS. 2, 4, 8, and 10, and the functions of the control unit 611, the software part of the communication unit 613, and the verification unit 615 in the verification server 610 shown in FIG. 11 are realized.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk drive), magneto-optical storage media (for example, magneto-optical disc), compact disc-read only memory (CD-ROM), compact disc-recordable (CD-R), compact disc-rewritable (CD-R/W), and semiconductor memories (for example, mask ROM, programmable ROM (PROM), erasable PROM (EPROM), flash ROM). The program storage unit 102 shown in FIGS. 2, 4, 8, and 10 and the program storage unit 612 shown in FIG. 11 are realized by the storage device 1001.

The program may be stored in various types of transitory computer readable media. The transitory computer readable medium is supplied with the program through, for example, a wired or wireless communication channel, or, through electric signals, optical signals, or electromagnetic waves.

In addition, the configuration information storage unit 104 and the verification information storage unit 106 shown in FIGS. 2, 4, and 8, and the configuration information storage unit 614 and the verification information storage unit 616 shown in FIG. 11 are realized by a memory 1002 or the storage device 1001.

Figure 15:
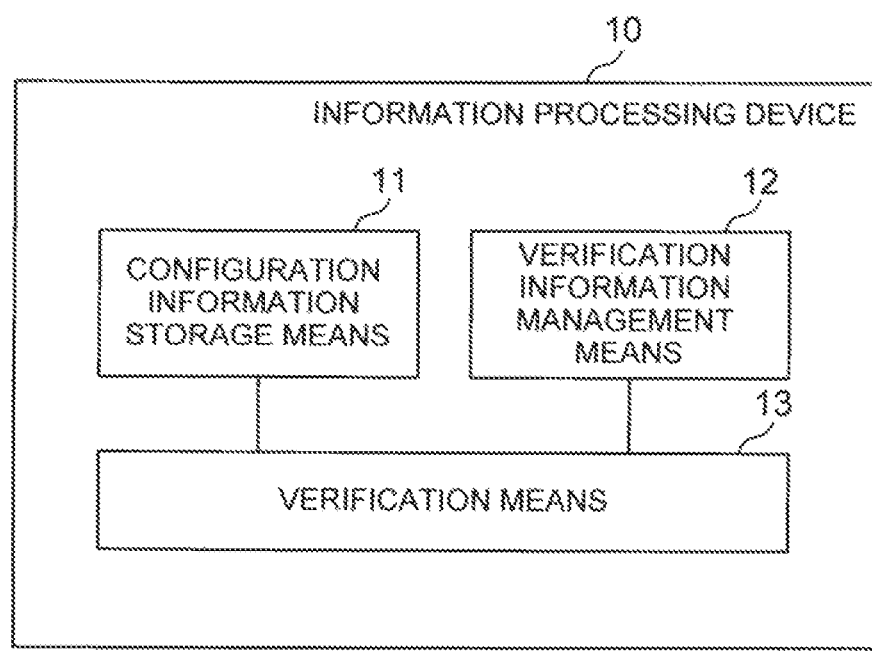
FIG. 15 It depicts a block diagram illustrating the main part of an information processing device.

FIG. 15 is a block diagram illustrating the main part of an information processing device. An information processing device 10 shown in FIG. 15 comprises configuration information storage means 11 (realized by the configuration information storage unit 104 in the example embodiment) for storing cluster configuration information making it possible to identify which cluster each information processing device in a system including multiple information processing devices belongs to, verification information management means 12 (realized by the verification unit 105, 205 and the verification information storage unit 106 in the example embodiment) for managing a first value corresponding to a content of a program of each of the information processing devices in the system, and verification means 13 (realized by the verification unit 105, 205 in the example embodiment) for deriving a second value for a program in the information processing device by a method identical to a method of deriving the first value in response to reception of a verification request, and transmitting the second value to a transmission source of the verification request, wherein the verification means transmits the verification request to an information processing device in the cluster identified by the cluster configuration information in response to reception of the verification request, and verifies the program in the information processing device by comparing the second value received from the information processing device with the first value.

The information processing device 10 may further comprises a cluster processing means (realized by the cluster processing unit 207, 507 in the example embodiment) for configuring the cluster based on cost between the information processing devices in the system.

Figure 16:
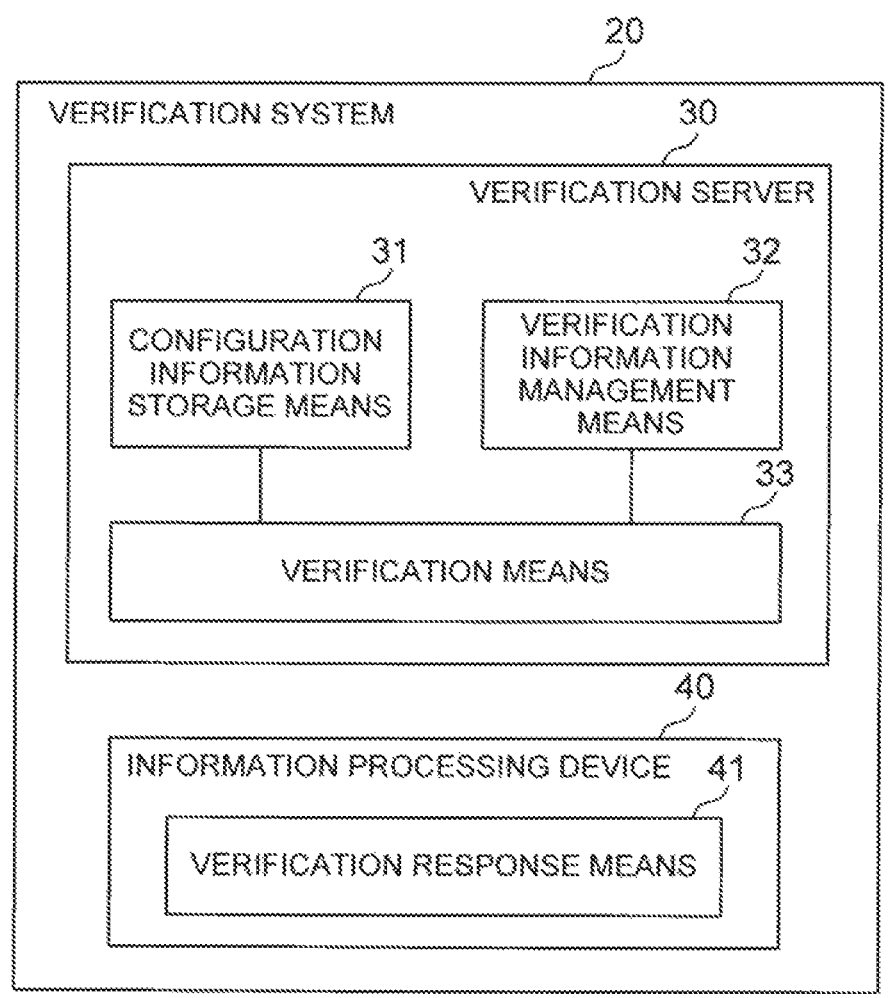
FIG. 16 It depicts a block diagram illustrating the main part of a verification system.

FIG. 16 is a block diagram illustrating the main part of a verification system. A verification system 20 shown in FIG. 16 comprises a verification server 30 including configuration information storage means 31 (realized by the configuration information storage unit 614 in the example embodiment) for storing cluster configuration information making it possible to identify which cluster each information processing device in a system including multiple information processing devices belongs to, and verification information management means 32 (realized by the verification unit 615 and the verification information storage unit 616 in the example embodiment) for managing a first value corresponding to a content of a program of each of the information processing devices in the system, and an information processing device 40, belonging to a cluster to which the verification server 30 belongs, including verification response means 41 (realized by the verification response unit 605 in the example embodiment) for deriving a second value for a program in the information processing device by a method identical to a method of deriving the first value in response to reception of a verification request, and transmitting the second value to a transmission source of the verification request, wherein the verification server 30 further comprises verification means 33 (realized by the verification unit 615 in the example embodiment) for transmits the verification request to an information processing device in the cluster identified by the cluster configuration information in response to reception of the verification request, and verifies the program in the information processing device by comparing the second value received from the information processing device with the first value.

Some or all of the above example embodiments can be described as in the following supplementary notes, but are not limited to the following supplementary notes.

(Supplementary note 1) An information processing device comprising:
configuration information storage means for storing cluster configuration information making it possible to identify which cluster each information processing device in a system including multiple information processing devices belongs to;
verification information management means for managing a first value corresponding to a content of a program of each of the information processing devices in the system; and
verification means for deriving a second value for a program in the information processing device by a method identical to a method of deriving the first value in response to reception of a verification request, and transmitting the second value to a transmission source of the verification request,
wherein the verification means transmits the verification request to an information processing device in the cluster identified by the cluster configuration information in response to reception of the verification request, and verifies the program in the information processing device by comparing the second value received from the information processing device with the first value.

(Supplementary note 2) The information processing device according to Supplementary note 1, wherein
the verification information management means is verification information storage means for storing the first value calculated from the program.

(Supplementary note 3) The information processing device according to Supplementary note 1, wherein
the cluster is formed of information processing devices having an identical program, and
the first value managed by the verification information management means is a common value for each of the information processing devices in the cluster, and
the verification means compares the second value received from each of the information processing devices in the cluster with the common value.

(Supplementary note 4) The information processing device according to Supplementary note 1, wherein
the cluster is formed of information processing devices having similar programs,
the first value managed by the verification information management means is an index value for determining a similarity calculated from the programs, and
the verification means verifies the program of each of the information processing devices in the cluster by determining a similarity between the first value and an index value as the second value.

(Supplementary note 5) The information processing device according to Supplementary note 1, wherein
the cluster is formed of information processing devices having programs whose attributes are similar,
the first value managed by the verification information management means is the attribute of the program, and
the verification means verifies the program of each of the information processing devices in the cluster by determining whether the first value matches the attribute of the program as the second value.

(Supplementary note 6) The information processing device according to any one of Supplementary notes 1 to 5, further comprising
cluster processing means for configuring the cluster based on cost between the information processing devices in the system.

(Supplementary note 7) A verification system comprising:
a verification server including configuration information storage means for storing cluster configuration information making it possible to identify which cluster each information processing device in a system including multiple information processing devices belongs to, and verification information management means for managing a first value corresponding to a content of a program of each of the information processing devices in the system; and
an information processing device, belonging to a cluster to which the verification server belongs, including verification response means for deriving a second value for a program in the information processing device by a method identical to a method of deriving the first value in response to reception of a verification request, and transmitting the second value to a transmission source of the verification request,
wherein the verification server further comprises verification means for transmits the verification request to an information processing device in the cluster identified by the cluster configuration information in response to reception of the verification request, and verifies the program in the information processing device by comparing the second value received from the information processing device with the first value.

(Supplementary note 8) An information processing method comprising:
  storing cluster configuration information making it possible to identify which cluster each information processing device in a system including multiple information processing devices belongs to;
  managing a first value corresponding to a content of a program of each of the information processing devices in the system;
  deriving a second value for a program in the information processing device by a method identical to a method of deriving the first value in response to reception of a verification request, and transmitting the second value to a transmission source of the verification request; and
  transmitting the verification request to an information processing device in the cluster identified by the cluster configuration information in response to reception of the verification request, and verifying a program in the information processing device by comparing the second value received from the information processing device with the first value.

(Supplementary note 9) The information processing method according to Supplementary note 8, wherein
  the first value is managed by storing the first value calculated from a program.

(Supplementary note 10) The information processing method according to Supplementary note 8, wherein
  the cluster is formed of information processing devices having an identical program, and
  the first value is a common value for each of the information processing devices in the cluster, and
  the program in the information processing device is verified by comparing the second value received from each of the information processing devices in the cluster with the common value.

(Supplementary note 11) The information processing method according to Supplementary note 8, wherein
  the cluster is formed of information processing devices having programs whose attributes are similar,
  the first value is an index value of a similarity calculated from the programs in the information processing devices, and
  the program of each of the information processing devices in the cluster is verified by determining a similarity between the first value and an index value as the second value.

(Supplementary note 12) The information processing method according to Supplementary note 8, wherein
  the cluster is formed of information processing devices having programs whose attributes are similar,
  the first value is the attribute of the program, and
  the program of each of the information processing devices in the cluster is verified by determining whether the first value matches the attribute of the program as the second value.

(Supplementary note 13) The information processing method according to any one of Supplementary notes 8 to 12, further comprising
  configuring the cluster based on cost between the information processing devices in the system.

(Supplementary note 14) An information processing program for causing a computer to execute:

a process of managing a first value corresponding to a content of a program of each of information processing devices in a system including a plurality of the information processing devices;
  a process of deriving a second value for a program in the information processing device by a method identical to a method of deriving the first value in response to reception of a verification request, and transmitting the second value to a transmission source of the verification request; and
  a process of transmitting a verification request to the information processing device in a cluster identified by cluster configuration information making it possible to identify which cluster each information processing device in the system including multiple information processing devices belongs to, and verifying a program in the information processing device by comparing the second value received from the information processing device with the first value.

While the present invention has been explained with reference to the example embodiment, the present invention is not limited to the aforementioned example embodiment. Various changes understandable to those skilled in the art within the scope of the present invention can be made to the structures and details of the present invention.

REFERENCE SIGNS LIST 10, 40 Information processing device
11 Configuration information storage means
12 Verification information management means
13 Verification means
20 Verification system
30 Verification server
31 Configuration information storage means
32 Verification information management means
33 Verification means
41 Verification response means
100, 200, 500, 600 Information processing device
101 Control unit
102 Program storage unit
103 Communication unit
104 Configuration information storage unit
105, 205 Verification unit
106 Verification information storage unit
110A, 110B, 620A, 620B Cluster
120 Verification request source
130 Administrator
207, 507 Cluster processing unit
605 Verification response unit
610, 610A, 610B Verification server
611 Control unit
612 Program storage unit
613 Communication unit
614 Configuration information storage unit
615 Verification unit
616 Verification information storage unit
630 Verification request source
1000 CPU
1001 Storage device
1002 Memory

What is claimed is:
1. An information processing device comprising:
  a configuration information storage that stores cluster configuration information capable of identifying which cluster each information processing device in a system including multiple information processing devices belongs to;
a verification information storage that stores a first value calculated from a program;
a memory storing instructions; and
one or more processors configured to execute the instructions to:
derive an index value as a second value for the program in the information processing device by a calculation method identical to a calculation method of deriving the first value in response to reception of a verification request, and transmit the index value to a transmission source of the verification request,
wherein the one or more processors are configured to execute the instructions to transmit the verification request to an information processing device in the cluster identified by the cluster configuration information in response to reception of the verification request, and verify the program in the information processing device by comparing the index value received from the information processing device with the first value.

2. The information processing device according to claim 1, wherein
the cluster is formed of information processing devices having an identical program, and
the first value is a value shared between the programs.

3. The information processing device according to claim 1, wherein
the first value is an index value for determining a similarity calculated from the programs, and
the one or more processors are configured to execute the instructions to verify the program of each of the information processing devices in the cluster by determining a similarity between the first value and the index value as the second value.

4. The information processing device according to claim 1, wherein
the first value is an attribute of the program, and
the one or more processors are configured to execute the instructions to verify the program of each of the information processing devices in the cluster by determining whether the first value matches the attribute of the program as the index value as the second value.

5. The information processing device according to claim 1, wherein
the one or more processors are further configured to execute the instructions to create a spanning tree indicating a connection relationship between the clusters and a connection relationship between the information processing devices, and configure the cluster by obtaining a minimum-cost spanning tree.

6. The information processing device according to claim 1, wherein
the one or more processors are configured to execute the instructions to calculate a Hamming distance based on binary values of the program, a checksum, or a value of an error correcting code as the index value.

7. A verification system comprising:
a verification server including a configuration information storage that stores cluster configuration information capable of identifying which cluster each information processing device in a system including multiple information processing devices belongs to, a verification information storage that stores a first value calculated from a program, a memory storing instructions, and one or more processors configured to execute the instructions; and
an information processing device, belonging to a cluster to which the verification server belongs, including a memory storing instructions, and one or more processors configured to execute the instructions to derive an index value as a second value for the program in the information processing device by a calculation method identical to a calculation method of deriving the first value in response to reception of a verification request, and transmit the index value to a transmission source of the verification request,
wherein the one or more processors in the verification server are configured to execute the instructions to transmit the verification request to an information processing device in the cluster identified by the cluster configuration information in response to reception of the verification request, and verify the program in the information processing device by comparing the second value the index value received from the information processing device with the first value.

8. The verification system according to claim 7, wherein the one or more processors in the verification server are configured to execute the instructions to calculate a Hamming distance based on binary values of the program, a checksum, or a value of an error correcting code as the index value.

9. An information processing method executable by a processor and comprising:
storing cluster configuration information capable of identifying which cluster each information processing device in a system including multiple information processing devices belongs to;
storing a first value calculated from a program;
deriving an index value as a second value for the program in the information processing device by a calculation method identical to a calculation method of deriving the first value in response to reception of a verification request, and transmitting the index value to a transmission source of the verification request; and
transmitting the verification request to an information processing device in the cluster identified by the cluster configuration information in response to reception of the verification request, and verifying the program in the information processing device by comparing the index value received from the information processing device with the first value.

10. The information processing method according to claim 9, wherein
the cluster is formed of information processing devices having an identical program, and
the first value is a value shares between the programs.

11. The information processing method according to claim 9, wherein
the first value is an index value for determining a similarity calculated from the programs in the information processing devices, and
the program of each of the information processing devices in the cluster is verified by determining a similarity between the first value and the index value as the second value.

12. The information processing method according to claim 9, wherein
the first value is an attribute of the program, and
the program of each of the information processing devices in the cluster is verified by determining whether the first value matches the attribute of the program as the index value as the second value.

13. The information processing method according to claim 9, further comprising:
creating a spanning tree indicating a connection relationship between the clusters and a connection relationship between the information processing devices; and
configuring the cluster by obtaining a minimum-cost spanning tree.

14. A non-transitory computer readable information recording medium storing an information processing program that, when executed by a processor, performs:
storing cluster configuration information capable of identifying which cluster each information processing device in a system including multiple information processing devices belongs to;
storing a first value calculated from a program;
deriving an index value as a second value for the program in the information processing device by a calculation method identical to a calculation method of deriving the first value in response to reception of a verification request, and transmitting the index value to a transmission source of the verification request; and
transmitting the verification request to an information processing device in the cluster identified by the cluster configuration information in response to reception of the verification request, and verifying the program in the information processing device by comparing the index value received from the information processing device with the first value.

15. The information processing method according to claim 9, wherein
a Hamming distance based on binary values of the program, a checksum, or a value of an error correcting code is calculated as the index value.

16. The non-transitory computer readable information recording medium according to claim 14, wherein the information processing program performs calculating a Hamming distance based on binary values of the program, a checksum, or a value of an error correcting code as the index value.

* * * * *